June 10, 1947.　　　H. L. HARTMAN　　　2,421,910
TURNTABLE DRIVE FOR PHONOGRAPHS
Filed Aug. 24, 1944
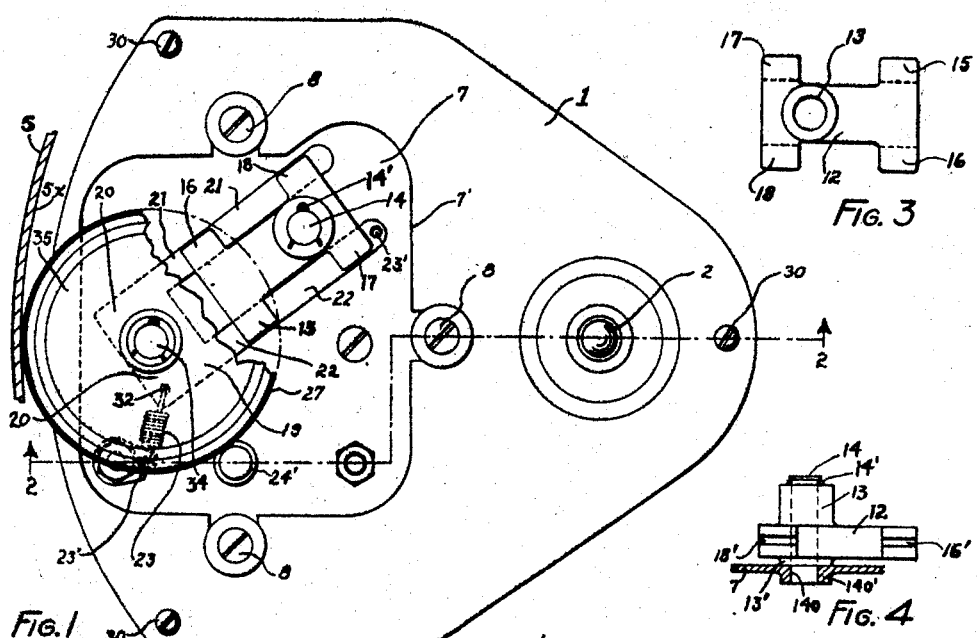
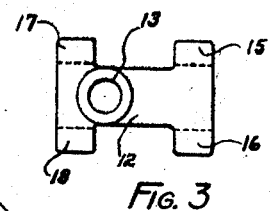
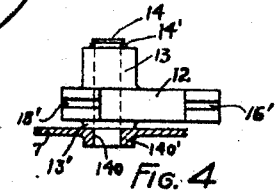
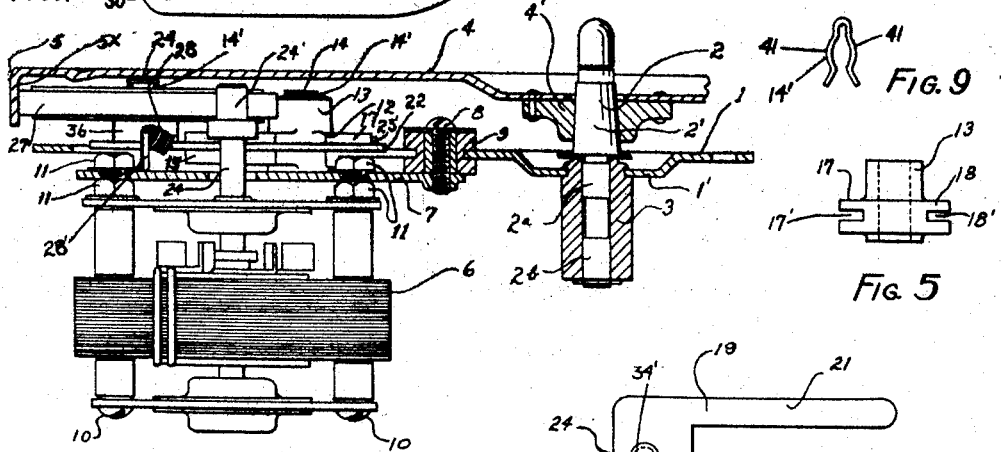
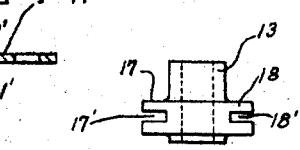
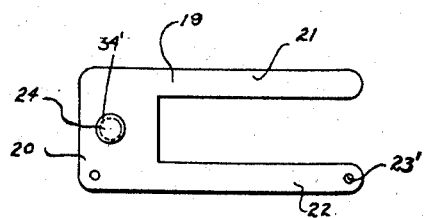
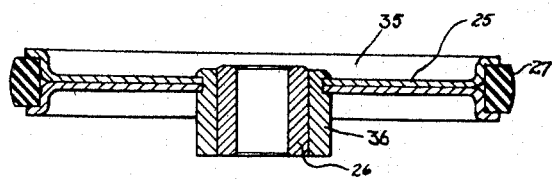
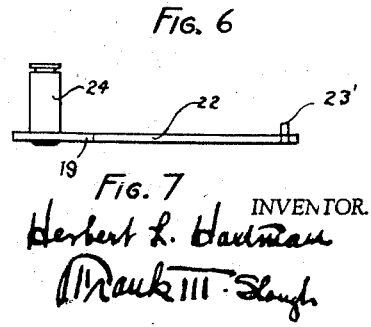
INVENTOR.
Herbert L. Hartman
BY Patented June 10, 1947

2,421,910

UNITED STATES PATENT OFFICE 2,421,910

TURNTABLE DRIVE FOR PHONOGRAPHS

Herbert L. Hartman, Elyria, Ohio, assignor to The General Industries Company, Elyria, Ohio, a corporation of Ohio Application August 24, 1944, Serial No. 550,995

2 Claims. (Cl. 74—206)

My invention relates to a turntable drive for phonographs and pertains to phonograph drives for frictionally transmitting power from a small motor to the rim of a turntable.

My invention relates more particularly to that type of drive wherein the interior surface of the short vertically pendant rim of a phonograph turntable is frictionally engaged by a so-called idler wheel to drive the turntable, said wheel being, in turn, driven by a roller engaging said idler wheel at a point disposed angularly with respect to the portion thereof making frictional engagement with said turntable flange, and is specific to an improved mount for said idler wheel.

Phonograph drives of the general type to which my invention pertains are now commonly in use, an example thereof being disclosed in United States Patent No. 2,312,798 to Carrington.

The idler wheel for which I now provide an improved mount is preferably provided with a rubber or rubber-like peripheral tread, for presenting a suitable yieldable surface for frictional engagement with said turntable flange and said driving roller, without the communication of sound producing effects to the turntable.

The idler wheel is commonly rotatably mounted on a post which, in turn, is carried on a plate provided with an anchoring tongue, said tongue, as shown in the above patent, having been commonly provided with an elongated longitudinally extending aperture through which a pin machine screw, or other extension of the motor mounting plate underlying said idler carrying plate whereby the idler wheel supporting plate has been made longitudinally and swingably adjustable to permit concurrent frictional engagement by said wheel tread with both said motor driving roller and said turntable flange. Other prior designs provide merely a swinging arm, supporting the idler, which is merely arcuately movable.

Both of the above prior designs for the idler wheel supporting plate have been found deficient in that the type permitting mere swinging of the wheel supporting plate does not permit the wheel to float in directions longitudinal of the wheel supporting plate whereby unequal contact pressure with the driving roller and turntable flange results, with attendant variations in turntable speed.

In the type wherein the plate is anchored by a stationary pin or screw, the connection between the anchoring pin and the supporting plate must be loose, in order to permit the plate to freely move under the resilient power of a spring to achieve its most efficient driving position, and such loose coupling gives rise to vertical or tilting movements of the plate, ofttimes giving rise to vertical vibratory movements with the result that a derivative of such movements is communicated to the phonograph turntable, thereby distorting the sound effects of a reproducing record superposed on the turntable.

Objects of my invention therefore comprise:

To provide an improved mount for a rotatable idler wheel of turntable drives of the class above mentioned.

To provide such a mount comprising an idler wheel support which while permitting such idler wheel to freely floatingly swing arcuately, also permits free floating movement thereof outwardly and inwardly, with respect to the turntable axis, to maintain universality of movement of the wheel in a plane parallel to the turntable, with a minimum of frictional restraint.

To provide an improved mount for phonograph turntable drives which achieves the foregoing objects by the provision of improved structure whereby the mount is non-susceptible to permitting the idler wheel or any portion thereof to move vertically.

Other objects of my invention and the invention itself will be apparent to those skilled in the art to which my invention appertains from the following drawings of a preferred embodiment of my invention and from the accompanying description of the said embodiment, in which drawings:

Fig. 1 illustrates, in plan view, an embodiment of my invention carried on a supporting plate for the mechanism, the illustrated idler wheel being shown with a portion broken away to reveal underlying parts and with the turntable removed for the same purpose;

Fig. 2 is a section on the staggered line 2—2 of Fig. 1 and with certain parts illustrated in side elevational view;

Figs. 3, 4 and 5, are plan, side elevational and end elevational views, respectively, of a rotative element of my improved idler wheel mount, Fig. 4 additionally showing a fragment of the supporting plate in cross sectional view and end portions of a mounting spindle also in side elevation;

Figs. 6 and 7 are, respectively, plan and side elevational views of the other element of my improved two-part idler wheel mount; and Fig. 8 is a vertical diametrical cross sectional view, shown in relatively larger scale, of the idler wheel.

Fig. 9 shows in plan, a retainer employed in the said embodiment.

Referring now to all of the drawings, in all of which like parts will be designated by like reference characters, the main supporting plate for the phonograph mechanism to which my improved idler wheel mount is illustrated as adapted is shown at 1, the said plate being provided with a small circular perforation in a depressed portion 1' to permit a vertical bearing element 3 to be secured to said plate mostly in pendant relation thereto whereby the turntable post 2 having bearing portions at 2a and 2b may be projected into the tubular bearing 3, said post having an upwardly extending tapered turntable supporting portion 2' upon which the socket element 4' of said turntable 4 is adapted to tightly rigidly fit said port, which is provided with the usual upwardly projecting post portion, over which the centrally apertured disc records may be telescoped.

The turntable 4 is peripherally provided with the usual pendant cylindrical flange 5, the inner surface 5x of which is adapted to be engaged by the idler wheel of Fig. 8. Another relatively large opening, whose edge is indicated at 7', is provided through the plate 1 whereby a supplemental plate 7 is pendantly firmly supported by a plurality of rubber grommets 9, which are secured thereto, by the usual screws 8.

In the preferred embodiment illustrated in the drawings, the entire turntable driving mechanism comprising the motor, the idler wheel, together with the idler wheel supporting means are unitarily mounted on the supplemental plate 7 which is maintained in parallel relation to the main plate 1 which, in turn, is adapted for mounting on a phonograph cabinet, by mounting screws 30.

The motor 6 is pendantly carried by the plate 7 through the instrumentality of bolts 10 and nuts 11, the motor shaft 24 being projected vertically through a suitable opening through the plate 7 and a power transmission roller 24' is rigidly fitted onto the upper end of said shaft.

The idler wheel, shown in Fig. 8, comprises a bearing hub 26, a radial web 25 and peripheral rubber tread 27. My improved mount for said idler wheel comprises two relatively movable parts, adapted for relative interlocking sliding engagement, the first of said parts being shown in Figs. 3, 4 and 5, comprises an I-shaped block having a main or web portion 12, and a pair of relatively transversely extending flanges at each of the two ends of the web, the flanges 15 and 16 being provided at one end of the web 12 extending relatively oppositely, and the similarly formed flange arms 17 and 18 being parallel to the other arms, and disposed at the other end of said web. At a point near one end of the web 12, an upwardly extending tubular flange 13 is provided with a downwardly extending tubular counterpart 13' on the lower side of the web, with a bearing bore extending vertically through said upper and lower tubular flange portions, and the intervening web portions.

The said I-shaped block is preferably made as a die casting, and preferably of good bearing material, and with reference to the nature of the material, other material may be used, but in such a case, the bore and end surfaces of the tubular portion 13—13' should have bearing material applied thereto.

In the embodiment illustrated, the bore, for the tubular flange portions and intervening web, has its axis disposed medially of the web 12, and the bore axis is disposed preferably nearer one end of the I-shaped block than to the opposite end in the preferred ratio of 3 to 7. All of the flanges 15, 16, 17 and 18, are alike inwardly slotted, the side walls of the slots being preferably nearly four times the width of said slots and the junctions between the side wall and the end wall of each slot are preferably made to provide sharp corners.

The lateral slots of the I-block are best shown in Figs. 3 to 5 inclusive, the companion slots for the one side of the I-block being shown at 16' and 18' and only one of the slots 17' being shown in outline in Fig. 5, and the slot for the flange 15 being, of course, like the slot 16'.

The I-shaped block is mounted on a vertically disposed pin 14, grooved near its head end, and whose lower end is drive fitted, at 140, into an aperture of the plate 7, as best shown in Fig. 4; the bore 140, of the plate 7, into which the lower end of the pin is drive fitted, is preferably lengthened by the provision of the short tubular flange 140', of the plate 7. A retainer 14' (Fig. 9) of the so-called hairpin type having arcuately bowed arm portions 41 is resiliently snapped into the groove of the pin 14.

The spindle retainer and plate 7 being made of relatively harder steel material and the bearing surfaces of the block 12 being of softer bearing material, the block is freely rotatable on the spindle and at the same time is rigidly held against any vertical or tilting movements.

The slide plate illustrated in two views in Figs. 6 and 7 preferably comprises a U-shaped plate 19 having a yoke portion 20 and a pair of parallel relatively spaced arms 21 and 22, said plate being suitably apertured at 23' and 24' to receive the lower ends of a wheel spindle 24 and a stop pin 23, each being drive fitted into said plate apertures, the latter during assembly of the slide and block.

The spindle 24 is formed similarly to the spindle 14 and comprises a pin with an annular groove in its head portion for the reception of a similar hairpin retainer 24' after the telescoping of the hub of the idler wheel 35 of the spindle by its tubular hub bearing portion 26, the wheel hub proper, shown at 36, having the bearing tube 26 drive fitted therein and carries the wheel web 25 in an annular recess of the hub 26 which is formed in the well known manner by heading outwardly an initially more elongated upper end portion of the hub 2 to rigidly clamp the wheel web onto the hub.

The web 25 is preferably formed of two discs rigidly bolted or welded together at suitable intervals of its planular extent and preferably affords an annular wheel rim recess at its periphery, within which the rubber or like wheel tread 27 is fitted. The tread 27 is initially formed as a continuous rubber or like annular band, of preferably smaller diameter and then is forcibly stretched over the wheel periphery and upon release resiliently constricts to fit tightly within the annular rim recess; otherwise, the tread 27 is initially fitted between the two rim parts, which are subsequently bolted or otherwise secured together.

The two-part support for the idler wheel may be assembled upon the plate 7 by placing the I-block 12 over the aperture 140 of the plate 7, shown in Fig. 4 and telescoping the spindle 14 through the aligned bore 13 of the element, and thereafter tightly pressing the lower end of the spindle into the bore 14O of the tubular flange 14O' to an extent as to position the peripheral spindle groove disposed slightly above the upper surface of the tubular flange 13, whereby pin 14' may be snapped into place with its arms received by the pin groove, said I-block being so fitted with its tubular end flanges 13 and 13' making bearing engagement respectively with the pin 14' and the narrow annular upper end surface of the plate 7 co-extensive with the end of the pendant flange 13'.

The area of bearing contact between the lower end surface of the supporting tubular flange 13' with the plate, in the illustrated embodiment, is only .10 sq. in., there being no other engagement between any other portion of the two-part wheel support and the supporting plate, whereby the frictional resistance, to free rotation of the block, is practically negligible as compared to that of prior constructions.

The element 12 is thereby with a minimum of friction swivelable about the spindle 14 but constricted against any appreciable vertical or tilting movements.

The slide 19 is then positioned in the plane of the slots of the flanges 15, 16, 17 and 18, and is longitudinally advanced by the tips of the arms 21 and 22 into said slots and after the tips of said arms are fully projected through the rearmost slots 17' and 18', the retaining pin 23 is tightly pressed into the aperture of one of the arms near its end whereby outward movement of the slide with respect to the grooves of the element 12 which functions to carry the slide is avoided.

The motor 6 being secured in position as shown and with an anchoring clip 23' clamped to the plate 7 by the uppermost one of the mounting nuts 11 shown near the right of Fig. 2, the helical wire spring 28 is secured at one end to said clip 28' and at its other end to the yoke portion 20 by an aperture 32 near the lowermost corner thereof, as shown in Fig. 1, whereby said spring being forcibly expanded during placement, by resilient retractile force effects a resiliently applied retractile effort to draw the slide 19 outwardly and towards the clip 23' until the rubber or like tread 27 of the idler wheel carried on the spindle 24 of the slide as previously described engages both the peripheral surface of the roller 24', and also the inner cylindrical surface 5x of the turntable. The angular relation between the axis of the idler wheel 35 and the two portions of the tread periphery which engage the roller 24' and the turntable flange surface 5x preferably approximates that previously used as shown in the aforesaid Carrington patent but in any event, is preferably greater than a right angle and substantially less than 180°, being preferably between 100° and 130°.

The specific precise angle is specifically no part of this invention, but being an obtuse angle, the pull by the spring tends more to increase the pressure of wheel contact with the driving roller than the pressure contact with the turntable flange; the turntable flange is, of course, concentric with the turntable post 2 and offers a larger area of bearing contact with the idler wheel than would the roller 24', and therefore less pressure contact between said wheel and flange is necessary for tractive purposes.

The slide 19 forms, in effect, a longitudinally reciprocal extension of the swivelable element 12, and the constant pull of the spring causes the wheel to continue to make proper bearing engagement with both said roller and said flange, the four sliding confining contacts between the slide and the guiding holder 12 permits the wheel to adjustably float in the radial direction corresponding to the axes of the spindles 24 and 34, and the free swiveling mounting of the element 12 permits the wheel to adjustably move arcuately, to find its proper bearing position with respect to the engaged roller and flange at all times, and to thereby compensate for possible irregularities from a true cylindrical form which may be present in some turntables as commercially manufactured.

The pin 23' prevents undue outward movement of the slide 19 from the block 12 and disassembly of the slide and block when the turntable is removed from the turntable post. By the means provided, the periphery of the wheel is always positioned in the same horizontal plane being freely and substantially non-frictionally floatable in all directions in said plane.

Having thus described my invention in a single embodiment, I am aware that numerous and extensive departures may be made therefrom but within the purview of my invention as defined in the following claims.

I claim:

1. An idler wheel supporting mechanism for the idler wheel of a phonograph motor drive mechanism of the class described wherein said wheel concurrently makes peripheral friction contact with a driving roller of relatively small diameter and the inner cylindrical surface of a peripheral turntable flange for driving the turntable, and wherein the motor is supported by a stationary portion of a phonograph casing comprising a guide of substantially block type form swivelable on the said casing portion, comprising a main stem or web with laterally extending arm portions at its ends, both pair of arm portions respectively disposed at the two sides of the web being inwardly slotted with the slots of each pair being in longitudinal alignment and a sliding plate having two relatively laterally spaced parallel arms, each of said slide plate arms adapted for bearing sliding engagement within the slots of a different pair of said first element arms, an upstanding bearing spindle rigidly affixed to another portion of said slide plate, said idler wheel by its hub portion being journalled on said spindle.

2. An idler wheel supporting mechanism for the idler wheel of a motor drive transmission of the class described wherein said wheel makes peripheral friction contact with both a motor driven roller of relatively small diameter and the inner surface of a pendant flange of a phonograph record supporting turntable, for driving the turntable, comprising a guide block comprising a web portion and a pair of laterally extending flange portions extending laterally in both directions from each end of the web, and the flanges at each side being substantially relatively spaced, the ends of all said flanges being inwardly slotted to the same effective depth and the slots of each pair of flanges being in alignment, and a slide plate comprising two relatively laterally spaced parallel arms, each adapted for bearing sliding engagement within the three walls of the flange slots disposed at respectively different sides of the block, a mounting plate for supporting said transmission, an upstanding vertical spindle affixed to said mounting plate and projecting upwardly therefrom, said block being provided with a tubular bearing hub adapted to be fitted over said spindle whereby said block is adapted for free swiveling horizontal movement about the axis of said spindle, a second spindle secured to said slide plate and extending vertically upwardly therefrom, said idler wheel journalled upon said second spindle, said block hub making limited annular bearing contact with said mounting plate, and said mechanism otherwise being free of engagement with any stationary element.

HERBERT L. HARTMAN.

REFERENCES CITED

The following references are of record in the file of this patent:

UNITED STATES PATENTS

| Number | Name | Date |
|---|---|---|
| 2,161,148 | Erwood | June 6, 1939 |

FOREIGN PATENTS

| Number | Country | Date |
|---|---|---|
| 213,638 | Switzerland | June 3, 1941 |